Nov. 22, 1966  H. KNAUST ETAL  3,286,816
BUCKET ELEVATOR
Filed Jan. 24, 1964  2 Sheets-Sheet 1
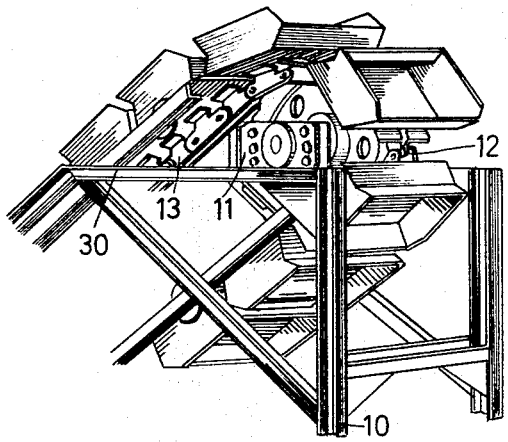
Fig.1.
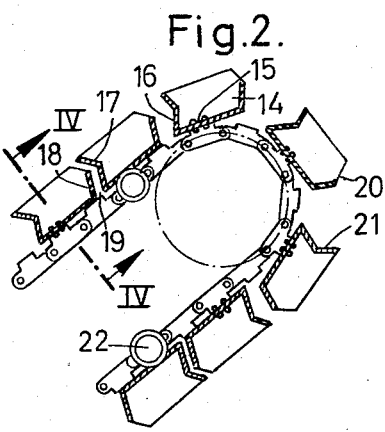
Fig.2.
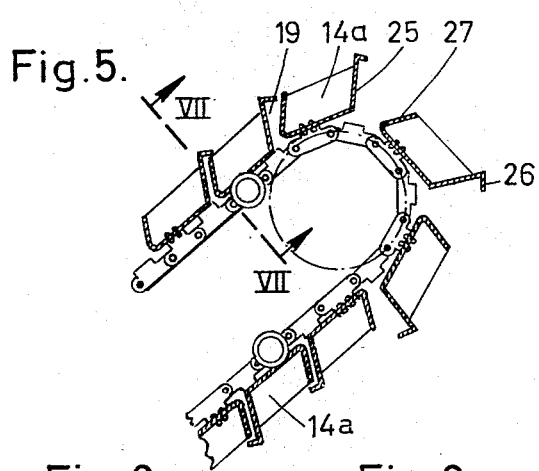
Fig.5.
Fig.7.  Fig.4.
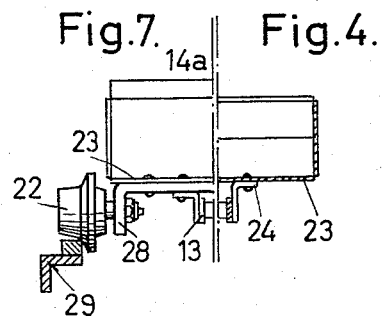
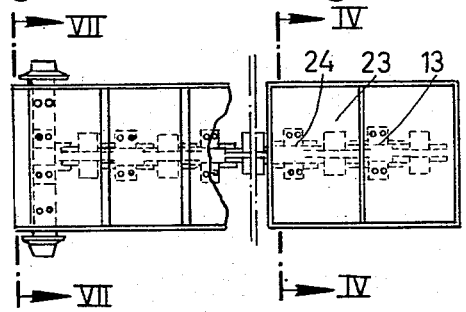
Fig.6.  Fig.3.
INVENTORS.
HERBERT KNAUST
ULRICH VON KRITTER
By
  *Fred Felman*
  AGENT United States Patent Office 3,286,816
Patented Nov. 22, 1966

3,286,816
BUCKET ELEVATOR
Herbert Knaust and Ulrich von Kritter, both of Heinr. v.
Kleiststr. 2, Bad Homburg vor der Hohe, Germany
Filed Jan. 24, 1964, Ser. No. 339,958
7 Claims. (Cl. 198—149)

This invention relates to conveyors, and more particularly to a bucket conveyor normally operated at an incline of at least 30° and, therefore, designated hereinafter as a bucket elevator.

The type of bucket elevator, with the improvement of which this invention is more specifically concerned, has a motor-driven endless chain successive links of which carry the several buckets. When elevators of this type are employed for conveying hard abrasive material, such as broken rocks, relatively large pieces of the conveyed material may be wedged in the slot between the opposite walls of successive buckets and damage the same. Smaller particles of the conveyed material may penetrate between successive buckets to the chain and cause premature wear of the same. Wear is also accelerated by material discharged from the buckets which is dropped on other parts of the mechanism.

The object of the invention is the provision of a bucket elevator of the type described in which the buckets and other parts of the elevator mechanism are protected against damage by the conveyed material.

It is a more specific object to prevent entry of conveyed material into the spaces between consecutive elevator buckets.

Another object is the controlled discharge of material from the buckets in a manner to ensure its being deposited as far from the elevator as possible.

Yet another object is the provision of an elevator having the greatest possible load capacity per unit of buckets and a comparatively smaller chain pitch in order to guarantee a shock-free travel around the sprockets.

With these and other objects in view, the invention in one of its aspects provides a lip on one of the two transverse walls of two consecutive buckets which define the afore-mentioned slot therebetween. The lip overhangs the slot and the top edge of the other transverse wall, and thus prevents entry of foreign matter into the slot during loading of the bucket. According to another feature of the invention, the center-to-center spacing of the buckets is made at least twice the center-to-center spacing of the individual chain links so that the chain travels smoothly over the head sprocket or pulley of the chain, and uncontrolled movements of the load at the point of discharge are avoided.

Other features and many of the attendant advantages of this invention will be readily appreciated as the same becomes better understood by reference to the following detailed description when considered in connection with the accompanying drawing wherein:

FIG. 1 is a fragmentary perspective view of a bucket elevator of the invention;

FIG. 2 shows the upper end portion of the elevator of FIG. 1 in side-elevational section;

FIG. 3 is a fragmentary plan view of the elevator of FIG. 1;

FIG. 4 shows one half of an elevator bucket in section on the line IV—IV in FIGS. 2 and 3;

FIG. 5 illustrates a modified elevator of the invention in a view corresponding to that of FIG. 2;

FIG. 6 is a fragmentary plan view of the elevator of FIG. 5;

FIG. 7 shows one half of the elevator of FIGS. 5 and 6 in section on the lines VII—VII;

Figure 8:
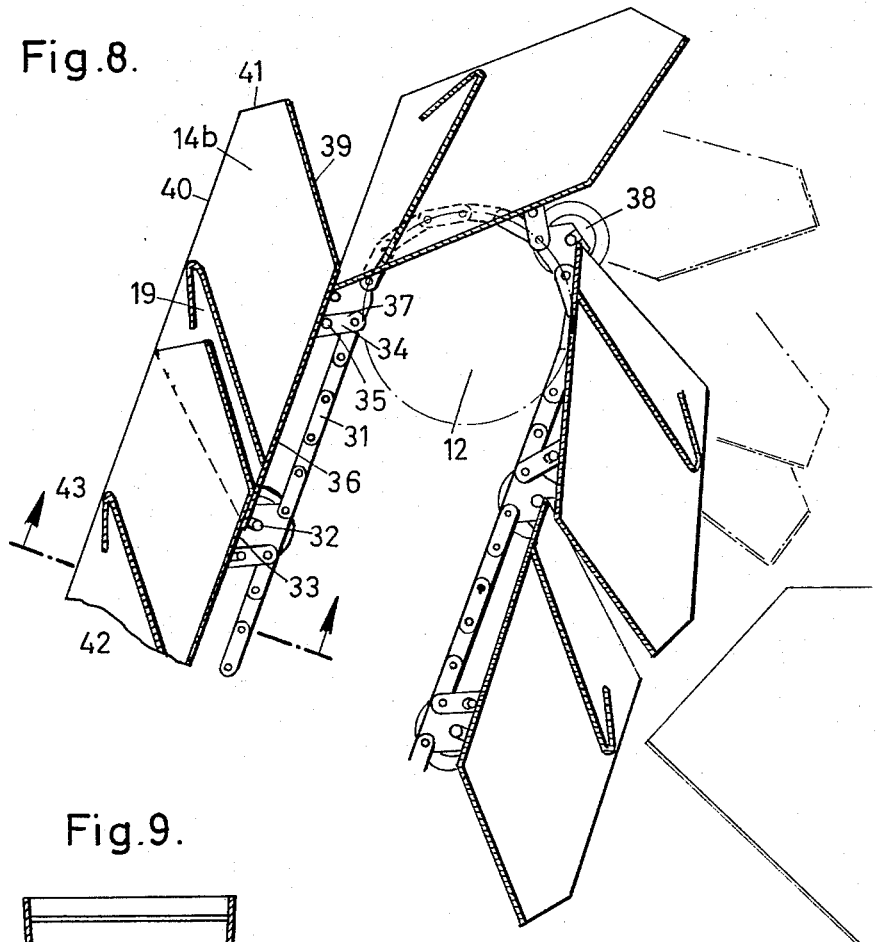
FIG. 8 illustrates yet another modified elevator of the invention in a view analogous to that of FIG. 2.

Referring now to the drawing in detail, and initially to FIGS. 1 to 4, there is seen a structural steel frame 10 on which the movable elevator elements are supported. Bearings 11 at the top of the frame 10 carry a head sprocket or pulley 12 over which an endless roller chain 13 is trained. It will be understood that a tail sprocket is similarly mounted on the frame 10 as the head pulley 12, and is driven by a motor in a conventional manner not illustrated.

As better seen in FIGS. 2–4, a bucket 14 is fastened to every second link 15 of the chain 13 by means of rivets. The rivets pass through a flange portion 24 of the link 15 approximately centered between the two associated rollers, and through a portion of the bucket bottom 23 which is closely adjacent the rear wall 16. The bottom portion of the rear wall 16 slopes obliquely forward from the bucket bottom 23 in the direction of normal bucket movement, and the top rear wall portion 21 slopes obliquely backward so that the two rear wall portions define a groove 17 transverse of the direction of chain movement.

The front wall 18 of each bucket is identical with and parallel to the bottom rear wall portion. When the identical buckets 15 travel over the straight upward run of the elevator, the bottom rear wall portion of each bucket 15 defines a narrow slot 19 with the adjacent front wall of the next bucket 15. The top portion 21 of the rear wall 17 overhangs and obstructs the slot 19. The front wall 18 lacks a top portion so that a discharge opening 20 is formed between the side walls of the bucket 15 above the top edge of the front wall 18.

The brackets 28 attached to every fifth bucket 14 carry lateral wheels 22 which travel on rails during upward movement of the buckets on the frame 10. The rails are supported on braces 30 of the frame 10.

The elevator partly illustrated in FIGS. 5 to 7 is closely similar to the afore-described embodiment of the invention, and will be described only as far as it differs from the apparatus shown in FIGS. 1 to 4.

Each elevator bucket 14a has a front wall 25 which slants obliquely forward and away from the bucket bottom, and a rear wall 27 parallel to the front wall 25. The front wall 25 extends beyond the top edges of the rear wall and the side walls of the bucket 14a in a direction away from the bottom, and carries an integral lip 26 which overhangs the slot 19 between the front wall 25 and the rear wall 27 of two consecutive buckets 14a while the buckets travel over the straight upward run of the elevator.

The wheels 22 which support each fifth bucket 14a are mounted on the corresponding chain link 15 by means of brackets 28 as shown in FIGS. 6 and 7, and travel on rails 29 which are mounted on the afore-mentioned frame braces 30. It will be appreciated that the wheel mountings of the two embodiments of the invention described so far are interchangeable.

Figure 9:
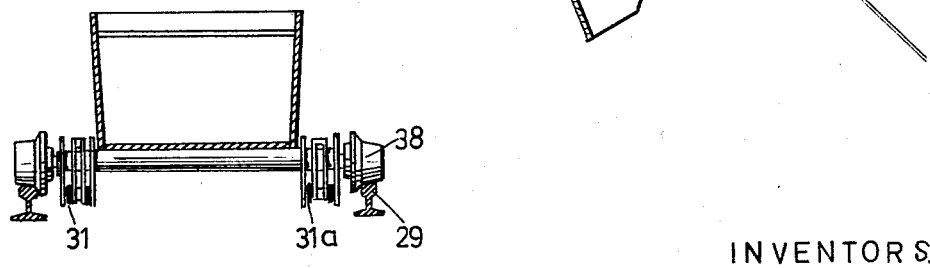
FIG. 9 shows the elevator of FIG. 8 in section on the line IX—IX.

The bucket conveyor of the invention shown in FIGS. 8 and 9 is provided with two roller chains 31, 31a. The buckets 14b are mounted between the two chains by means of shafts 32 one of which is fixedly attached to the rear of each bucket bottom 36 and engages enlarged chain links 33 which are separated from each other by five ordinary links. The front portion of each bucket bottom 36 is attached to one of the enlarged links 33 by means of a pin 35 which engages a slot in a guide lug 34. The lug is attached to an enlarged link 33 by the pin 37 which connects the link 33 to an adjacent ordinary chain link.

The wheels 38 of the elevator are arranged on the shafts 32, and are outwardly spaced from the buckets 14b. They travel on rails 29 supported on a frame in the manner described hereinabove with reference to FIGS. 1 to 7. In the elevator of FIGS. 8 and 9, one pair of wheels is associated with each bucket 14b.

The front wall 39 and the rear wall 42 of each bucket 14b are approximately parallel, but the top of the front wall and adjacent portions of the side walls are cut away to form a discharge opening 41 below the level of the top edges 40 of the side walls. A lip 43 extends rearward from the top of each rear wall 42 and somewhat toward the bottom of the next bucket 14b so as to overhang and obstruct the narrow slot 19 which forms between consecutive buckets during travel over the straight upward elevator run.

The operation of the several embodiments of the invention is conventional. The buckets are loaded while traveling over the upward run of the elevator, that is, the rails 29. The material dumped into the buckets is prevented from entering the slot 19 by the overhanging top portion 21 of the rear wall 16 in the embodiment of FIGS. 1 to 4, by the lip 26 of the front wall 25 in the embodiment of FIGS. 5 to 7, and by the corresponding lip 43 of the rear wall 42 in the embodiment of FIGS. 8 and 9. The buckets cannot be damaged by abrasive material wedged between them.

The center-to-center spacing of the buckets in the devices of FIGS. 1–7 is twice the center-to-center spacing of the individual chain links 15, six times the link spacing in the apparatus of FIGS. 8 and 9. The buckets therefore travel smoothly around the head sprocket or pulley 12, and discharge their contents at a substantial distance from the elevator in a controlled and predictable manner. In the elevator illustrated in FIGS. 8 and 9, abrasive contact between the elevator mechanism and the discharged material is further prevented by the extensible guide linkage formed by the lug 34 and the associated pins, which holds the discharge opening 41 as far away from the elevator as is possible until the contents of each bucket are dumped. Sequential positions of a bucket 14b, as it travels through the critical discharging position are indicated in chain-dotted outline in FIG. 8.

The slot 19 widens as its transverse walls move apart during travel about the head pulley 12. A wedging of conveyed material between these walls during or after discharge is securely avoided. The discharge of the conveyed material remote from the elevator is ensured by the fastening of the rear portion of each bucket to the associated supporting chain link 15.

Jamming of the buckets after passing the head pulley 12 is prevented by the specific illustrated configurations of the top wall portion 21, and of the lips 26 and 43.

Obviously, many modifications and variations of the present invention are possible in the light of the above teachings. It is therefore to be understood that, within the scope of the appended claims, the invention may be practiced otherwise than as specifically described.

What is claimed is:
1. A bucket elevator comprising, in combination:
 (a) a support;
 (b) pulley means on said support;
 (c) rail means mounted on said support and defining an upward elevator run;
 (d) an endless elongated chain constituted by a plurality of consecutive links and trained over said pulley means;
 (e) a plurality of wheels mounted on said chain in longitudinally spaced relationship and engaging said rail means;
 (f) a plurality of substantially identical buckets mounted on respective links of said chain,
  (1) each bucket having a bottom wall, two longitudinal side walls, and two longitudinally spaced walls transverse of the direction of elongation of said chain,
  (2) said side walls and said transverse walls extending from said bottom in a normally upward direction away from said chain when said bucket travels over said upward run and having respective top edges remote from said bottom wall,
  (3) said transverse walls respectively constituting the front and rear walls of said bucket, the rear wall of one bucket and the front wall of a consecutive bucket having respective portions adjacent said chain and obliquely inclined in a forward direction to the direction of bucket movement when the buckets travel over said upward run, said adjacent wall portions being substantially parallel and jointly defining a slot therebetween,
  (4) a portion of one of said walls remote from said chain overhanging said slot and the top edge of the other adjacent wall,
  (5) the center-to-center spacing of said buckets being at least twice the center-to-center spacing of said links in said direction of elongation; and
 (g) fastening means fixedly securing a portion of said bottom adjacent said rear wall and remote from said front wall to the respective link for mounting said bucket thereon.

2. An elevator as set forth in claim 1 further comprising fastening means fixedly securing a portion of said bottom adjacent said rear wall and remote from said front wall to the respective link for mounting said bucket thereon.

3. An elevator as set forth in claim 1, wherein said rear wall of each bucket has a bottom portion adjacent said bottom wall, and a top portion adjacent said top edge thereof, said rear wall portions being obliquely inclined relative to each other to define a groove transverse of said direction of elongation, said front wall of each bucket being substantially parallel to the bottom portion of the rear wall, and the top portion of said rear wall overhanging said slot and the top edge of the front wall of the consecutive bucket when traveling over said upward run.

4. An elevator as set forth in claim 1, wherein an integral portion of the rear wall of each bucket extends rearward from the top edge of said rear wall and obliquely relative to said direction of elongation, said integral portion overhanging the front wall of a following bucket and said slot when traveling over said upward run.

5. An elevator as set forth in claim 4, further comprising guide means forwardly spaced from said fastening means and extensibly securing a portion of said bottom wall adjacent said front wall and remote from said rear wall to a link of said chain.

6. An elevator as set forth in claim 1, wherein an integral portion of the front wall of each bucket extends forward from the top edge of said front wall in a direction obliquely inclined relative to said direction of elongation and overhangs the rear wall of a preceding bucket and said slot when traveling over said upward run.

7. A bucket elevator comprising, in combination:
 (a) a support defining a substantially straight elevator run, said run extending in an upward direction in the normal operating position of said support;
 (b) an endless elongated chain constituted by a plurality of consecutive links and trained over said support for longitudinal movement over said run in said direction;
 (c) a plurality of buckets mounted on respective links of said chain for movement therewith,
  (1) each bucket having a front portion and a rear portion, and two walls transverse of the direction of chain elongation and spaced from each other in said direction,
  (2) each of said walls constituting a pair of walls with a corresponding wall of an adjacent bucket, (3) the walls of each pair defining a slot between the adjacent buckets and being obliquely inclined in a common forward direction relative to said upward direction during movement of said adjacent buckets over said run;

(d) lip means on one wall of said pair and extending therefrom toward the other wall of the pair in a direction obliquely inclined relative to said upward direction during said movement of said adjacent buckets;

(e) fastening means fixedly securing said rear portion of each bucket to one link of said chain; and (f) extensible guide means securing said front portion of each bucket to another link of said chain.

References Cited by the Examiner

UNITED STATES PATENTS

| 1,171,516 | 2/1916 | Greely | 198—152 |
| 2,664,592 | 1/1954 | Ingraham | 198—152 |

FOREIGN PATENTS 506,420  9/1930  Germany.

EVON C. BLUNK, *Primary Examiner.*

RICHARD E. AEGERTER, *Examiner.*